June 21, 1966 F. A. KARR 3,256,802
CONTINUOUS CARBONATION SYSTEM
Filed March 14, 1962 3 Sheets-Sheet 1

INVENTOR.
Fred A. Karr
BY
Attorneys

INVENTOR.
Fred A. Karr
ATTORNEYS.

United States Patent Office 3,256,802
Patented June 21, 1966

3,256,802
CONTINUOUS CARBONATION SYSTEM
Fred A. Karr, Redwood City, Calif., assignor to Shasta Beverage Division of Consolidated Foods Corporation, San Francisco, Calif., a corporation of Maryland
Filed Mar. 14, 1962, Ser. No. 180,938
7 Claims. (Cl. 99—275)

This application is a continuation-in-part of my application Serial No. 125,403, filed July 20, 1961, and now Patent No. 3,180,664.

This invention relates to carbonation systems and more particularly to carbonation systems of the continuously operating type.

In the manufacture of beverages, especially in the manufacture of soft drinks and beer, the effectiveness of the carbonation is a main determining factor in the quality of the final beverage.

In the prior art, carbonation was conventionally accomplished in combination carbonator-coolers. The conventional carbonator-cooler is effectively a tank which includes, either internally or externally, a series of carrying or expansion type coolant coils. Water or other liquid is passed into the tank over a series of baffles and is also subjected to the action of one or more paddles to provide a splashing effect within the tank. A carbon dioxide atmosphere is maintained in the tank under pressure. Thus, during the splashing the liquid is subjected to and absorbs carbon dioxide gas.

These tanks are often fitted with means for receiving syrup or other flavoring to be mixed with the liquid while it is being carbonated and cooled.

After so carbonating and flavoring the liquid it is passed through a line to a filler tank from which it is ejected into bottles or cans under pressure. After filling under pressure, the open containers are momentarily subjected to the atmosphere for the capping operation.

While this type of carbonation system has many definite advantages it also has many disadvantages. Since the water passed to the carbonator-cooler is not precooled, part of the water in the cooler is relatively warm. It is a well known fact a warm liquid will not absorb gas as readily, nor will it absorb as much gas a cooled liquid. Consequently, it is difficult to carbonate the liquid by this method. To overcome this difficulty it has been customary in the prior art to subject the carbonator-cooler to high pressures in the neighborhood of fifty to sixty-five pounds per square inch. These pressures are well above the theoretical carbon dioxide saturation pressures (known as the "carbonating pressure") which is the only pressure necessary once the carbonation is accomplished. While this may be easily accomplished within the carbonator-cooler itself, there are serious after effects.

A predominant after effect is that the carbon dioxide absorbed by the water under such high pressure has a tendency to be rapidly released thus causing foam when exposed to the atmosphere as is necesary during the capping operation. Such foaming causes spillage and frequently results in a number of rejects when the spillage is substantial and empties the bottles to a point below the required volume of filling. This foaming is even more intense if the carbon dioxide includes even small portions of impurities such as sulphur dioxide or even air. Frequently, in order to remove these impurities the liquid carbon dioxide source must be "blown down" that is the carbon dioxide is allowed to boil vigorously into the atmosphere. The boiling, although it removes the impurities, results in substantial waste of carbon dioxide.

Since carbonation is accomplished in a tank like system, it is apparent that if some mechanical failure causes the operation to be temporarily stopped, the liquid in the tank becomes over-carbonated. If the liquid is bottled this over-carbonation causes excess foaming when the bottle is eventually opened by the consumer. When cans are used as containers for the over-carbonated liquid, there is a strong tendency for the can to buckle or burst when the liquid reaches room temperature.

Moreover, the foaming effect releases a substantially portion of the carbon dioxide in the liquid whereby the finished beverage will not have the desired degree of carbonation.

An additional draw-back in the carbonator-cooler method is realized in systems wherein the beverages are canned rather than bottled. In both the canning and bottling processes it is required, when filling the containers under pressure, to hold the bottle or can against a filling nozzle with sufficient force to overcome the pressure of the liquid. Since bottles have a relatively small opening or mouth the amount of force required to hold the bottle against the filling nozzle is relatively small. On the other hand, an unsealed can has a much larger mouth and the amount of force required to hold it against the filling nozzle is substantially greater. The substantially greater force required to fill cans creates unnecessary wear and poor economy with respect to the overall machine and particularly with respect to sealing gaskets between the nozzles and the cans to be filled.

Another disadvantage of the carbonator-cooler type method is the amount of time required to carbonate a given amount of liquid. Even under high pressures warm liquid and especially warm liquid including syrup, is reluctant to absorb any gas. Thus, it is required that the splashing action within the carbonator-cooler be continued over an extended period of time in order for the liquid to absorb a predetermined amount of carbon dioxide.

This problem is often aggravated due to the use of expansion type coolants in the carbonator-cooler coils. The temperature reached by this type of coolant often causes icing on and about the coils. The ice not only acts as a heat insulator but also causes variations in the Brix scale of the mixture.

It has been attempted to overcome the foaming problem by placing the entire capping apparatus in a relatively low temperature and under high pressure. The expense and inefficiency required for such an operation is obvious. Moreover, the interior of the bottles in such cases is subjected to the sudden high pressure during or immediately before the filling operation. Consequently, the bottle often breaks with the resulting hazards and waste.

Still other inefficiencies arise from the use of conventional carbonator-cooler systems. In such systems the carbon dioxide is applied in a gas although it is purchased and stored as a liquid. Consequently, the carbon dioxide storage tanks must be equipped with heaters as well as with refrigeration units. When the storage tank is not in use, pressure within the tank builds up due to the carbon dioxide's approach to ambient or room temperature. The tank is, therefore, refrigerated to reduce the pressure. On the other hand, when the tank is in use, expansion from the liquid to the gaseous state causes a temperature drop and a consequent drop in operating pressure. Heat is then applied to raise the pressure back to an optimum level.

It is, therefore, a general object of this invention to provide an improved carbonation system and apparatus which will overcome the above named disadvantages.

It is a more particular object of this invention to provide a carbonation system and apparatus wherein low pressures may be advantageously employed.

It is still another object of this invention to provide an improved carbonation system and apparatus of the continuously operating type.

Another object of this invention is to provide an improved carbonation system and apparatus wherein stoppage of the flow of carbonated liquid or of the liquid to be carbonated, instantly stops the admission of carbon dioxide whereby over carbonation is prevented.

It is still another object of this invention to provide a carbonation system and apparatus wherein the carbonated liquid is stabilized before being passed to the bottling or canning line.

A further object of this invention is to provide a carbonation system and apparatus wherein the carbonated liquid is stabilized to the point that traces of foreign gases in the carbon dioxide are ineffective to cause foaming in the filler heads.

It is still a further object of this invention to provide a carbonation system and apparatus wherein the liquid is cooled after carbonation in order to provide stabilization.

It is still another object of this invention to provide a carbonation system and apparatus for carbonating soft beverages wherein the liquid is carbonated prior to mixing with the syrup.

It is still another object of this invention to provide a carbonation system and apparatus wherein a liquid to be carbonated is first cooled and then carbonated and subsequently is cooled further to provide stabilization.

It is still another object of this invention to provide a carbonation system and apparatus having the aforementioned characteristics wherein the amount of carbon dioxide gas passed into the liquid is regulated by the degree of carbonation obtained.

It is still a further object of this invention to provide an improved carbonator for in-line carbonation systems.

It is a further object of this invention to provide an improved carbonator having the aforementioned characteristics and which causes carbon dioxide to be passed into the liquid under pressure and/or to be drawn into the liquid by a venturi action.

Another object of this invention is to provide a carbonation system and apparatus of the aforementioned character wherein relatively low pressures are used throughout the system.

A further object of this invention is to provide a carbonating system and apparatus wherein the carbonated liquid is applied to filler heads at pressures only slightly above the theoretical carbon dioxide saturation pressures (carbonating pressure).

It is still another object of this invention to provide a carbonating system and apparatus wherein liquid carbon dioxide is applied to the liquid to be carbonated wherein storage tanks for the liquid carbon dioxide need not be heated to maintain operating pressure.

Another object of this invention is to provide a carbonating system and apparatus of the aforementioned character wherein icing on cooling coils is eliminated whereby the Brix of the entire mixture is maintained constant.

These and other objects and features of the invention will become more clearly apparent upon a review of the following description in conjunction with the accompanying drawing, in which.

Figure 1:
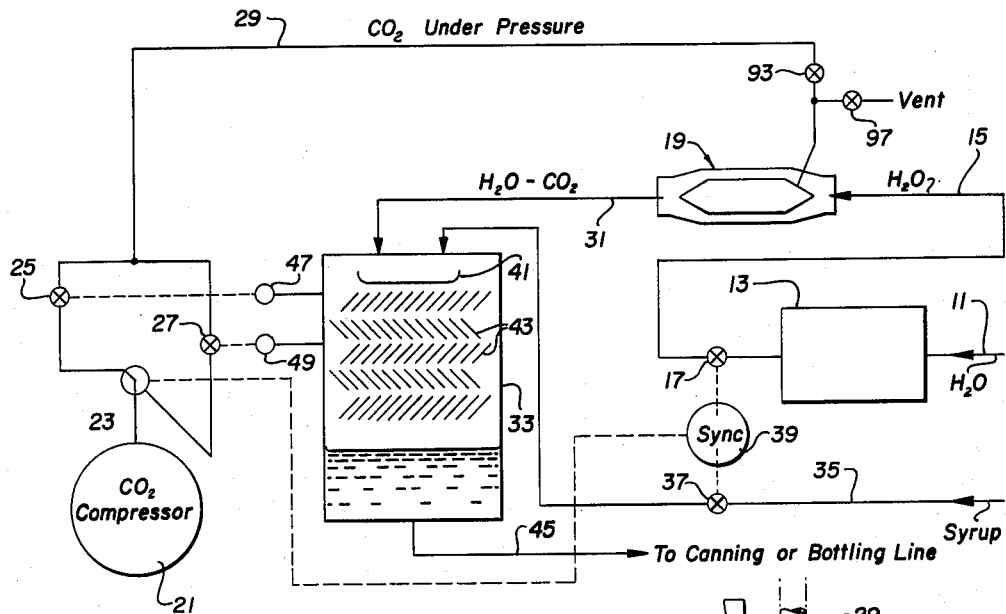
FIGURE 1 is a block schematic diagram of a system in accordance with one embodiment of this invention.

Referring to FIGURE 1, a system in accordance with one embodiment of the invention is shown, wherein a source of water is connected through a line 11 to a first cooler 13. The water from the cooler 13 is passed through the line 15 and the valve 17 to the carbonator 19 which will be described more fully hereinafter. Carbon dioxide from the pressurized source 21 is also passed to the carbonator 19 through the two-way valve 23, one or the other of the valves 25 or 27 and the line 29. In normal operation the carbon dioxide is passed through the valve 23 and the valve 25, as shown.

Carbonated water is passed from the carbonator 19 through the line 31 to a cooler 33. Also connected to the cooler 33 is the source of syrup through the line 35 and the valve 37. Thus, the cooler 33 may also serve as a mixing tank. The valve 17 controlling the water in the line 15 and the valve 37 controlling the syrup in the line 35 are each controlled by a synchrometer 39. In addition, the synchrometer 39 controls the operation of the valve 23 in the carbon dioxide line.

Operation of the synchrometer 39 is such that the amount of water delivered in the line 15 is determined by the amount of syrup passed through the line 35. When the total amount of syrup is exhausted for a particular run, the synchrometer closes the valve 17 in the water line. At the same time the synchrometer switches the valve 23 whereby carbon dioxide is passed through the valve 27 rather than through the valve 25, for reasons which will be described more fully hereinafter.

In the cooler 33, both the carbonated water and the syrup are received and mixed in a blending tray 41. The blend is then passed through openings in the bottom of the tray 41 on to a series of baffles 43 to separate the carbonated mixture into thin layers or droplets whereby rapid cooling may be accomplished. The carbonated mix of the cooled beverage is then passed from the bottom of the mixing tank 33 to a canning or bottling line 45.

While in the mixing tank 33, which is preferably relatively gas tight, the carbonated liquid may release a certain amount of carbon dioxide thereby creating an atmosphere of carbon dioxide within the tank. While this amount of carbon dioxide may be relatively small, it is sufficient to operate pressure sensors 47 and 49. The sensor 47 together with the valve 25 may be considered a dynamic pressure regulator while the detector 49 together with the valve 27 may be considered a static pressure regulator.

The operation of both regulators is such that as the pressure within the mixing tank rises the regulators tend to close the valves 25 and 27 respectively.

During normal operation, the valve 23 is in the position shown in FIGURE 1. Thus, the valve 25 and dynamic pressure sensor 47 normally controls the amount of carbon dioxide passed through the carbonator 19. By preadjusting the sensor 47 and the valve 25, a regulated volume of carbon dioxide is passed through the carbonator 19 to provide an equilibrium at a predetermined pressure within the cooler 33.

However, when the passage of water through the carbonator 19 is stopped by operation of the synchrometer 39 it is apparent that a lesser volume of carbon dioxide is required to maintain the equilibrium. The pressure sensor 47 and the valve 25 would operate slowly to cut off the source of carbon dioxide. But with this condition a substantial build up of carbon dioxide may be passed into the tank through the carbonator 19 and the line 31 before the valve 25 is completely closed. Sudden increase in pressure within the tank 31 would not only interfere with the constant carbonation of the liquid but would also subject the tank 33 to extremely hazardous pressures. Consequently, when the synchrometer 39 closes the valve 17 it simultaneously switches the valve 23 whereby the carbon dioxide is no longer passed through the valve 25, but rather through the valve 27.

The static pressure sensor 49 and the valve 27 are adjusted so that smaller volumes of gas are passed to the carbonator for a given pressure than are passed by the valve 25. Thus, the static condition of liquid within the cooler 33 may be accommodated. Carbon dioxide is still passed to the cooler 33 but in lesser amounts as required to maintain the equilibrium under the relatively static condition of liquid in the cooler.

Rather than the plurality of valves 23, 25 and 27, the plurality of pressure sensors 47, 49 and the control connection for the valve 23 to the synchrometer 39, a single pressure regulator device known as a Taylor control may be employed. The Taylor control is merely a high speed response pressure sensor which will activate a single valve in the carbon dioxide line to maintain the equilibrium of the system whether in the dynamic or the static state.

In operation of a system as shown in FIGURE 1, the water is first cooled to a temperature of about 50° F. at the cooling unit 13. It is apparent that water already of this temperature need not be cooled but may be applied directly to the carbonator 19.

The cooled water is passed to the carbonator 19 to receive an amount of carbon dioxide from the line 29. Since the water is cooled it is highly susceptible to the absorption of carbon dioxide and the carbonation is easily accomplished. The carbon dioxide may be forced into the stream of water either by a pressurized supply of carbon dioxide gas or liquid as illustrated in the described embodiment; or by a venturi action in the carbonator as will be hereinafter described. Preferably both the pressurized supply and the venturi action are employed.

The carbonated water then passes through the line 31 to the cooling tank or cooler 33. In the cooler 33 the carbonated liquid is further cooled which makes it susceptible to the absorption of additional carbon dioxide. With this additional cooling and additional susceptibility of the absorption of carbon dioxide there is little tendency for the release of gas. Thus, the carbonated liquid is stabilized and it is unnecessary to maintain a high pressure within the cooler 33. It has been found that pressures in the neighborhood of thirty pounds per square inch are sufficient for the successful operation of the system for all standard degrees of carbonation. While being further cooled in the cooler 33, the liquid may absorb additional amounts of the carbon dioxide from the gaseous atmosphere. However, this absorption is minimal and is not considered a predominate source of the total carbonation.

The cooled carbonated liquid is then, under the pressure within the cooler 33, passed through the line 45 to the canning or bottling line. Cans or bottles are filled by holding them against filling nozzles in sealed relationship whereby liquid is passed into the containers under pressure. Since the pressure in the cooler 33 is in an order of magnitude of thirty pounds per square inch rather than the usual fifty to sixty-five pounds per square inch required by the prior art, the force required to hold the cans or bottles against the nozzles is relatively small.

Moreover, since the carbonated liquid has been cooled after carbonation and thereby stabilized, when the cans or bottles are released from the nozzles and subjected to the atmosphere there is little or no tendency for the foaming release of carbon dioxide. Clearly, then, the number of rejects due to over spillage is substantially reduced.

While it was mentioned that a pressure of thirty pounds may be maintained within the cooler 33 the use even of this pressure may not always be necessary. The pressure here is maintained primarily for the purpose of controlling the application of carbon dioxide in the carbonator 19. If other means for controlling the amount of carbon dioxide are employed, the pressure within the cooler 33 may be still lower or even at atmospheric pressure. At extremely low or atmospheric pressures, the liquid may be fed through the line 45 by gravity or by pumps.

Additionally, while it was mentioned that the cooling unit 13 may cool the water to about 50° F. it should be clear that the amount of carbonation may be controlled by the temperature of the water as applied to the carbonator 19. It is well known to those skilled in the art that various beverages require varying amounts of carbonation to provide the most satisfactory end product. For instance, with orange drinks it is frequently desirable to maintain the carbonation to about one to one and one-half volumes of carbon dioxide to a volume of water.

On the other hand, with cola type drinks, high degrees of carbonation in the order of four volumes of gas to a volume of water are frequently employed.

Since the absorption of gas into the liquid may be easily controlled by the temperature of the liquid it is apparent that by controlling the temperature of the water passing into the carbonator 19, the amount of carbon dioxide absorption may be easily controlled. Thus, with low carbonation beverages it may be desirable to eliminate cooling unit 13 altogether and apply the water to the carbonator 19 at its natural temperature, which may be in the order of 70° F.

Thus, the temperature of the carbonated water through the line 31 may vary depending upon the temperature of the water applied thereto. In any event the carbonated liquid is cooled in the cooler 33, preferably to the order of about 35° F., thus the carbonated liquid becomes stabilized.

Figure 2:
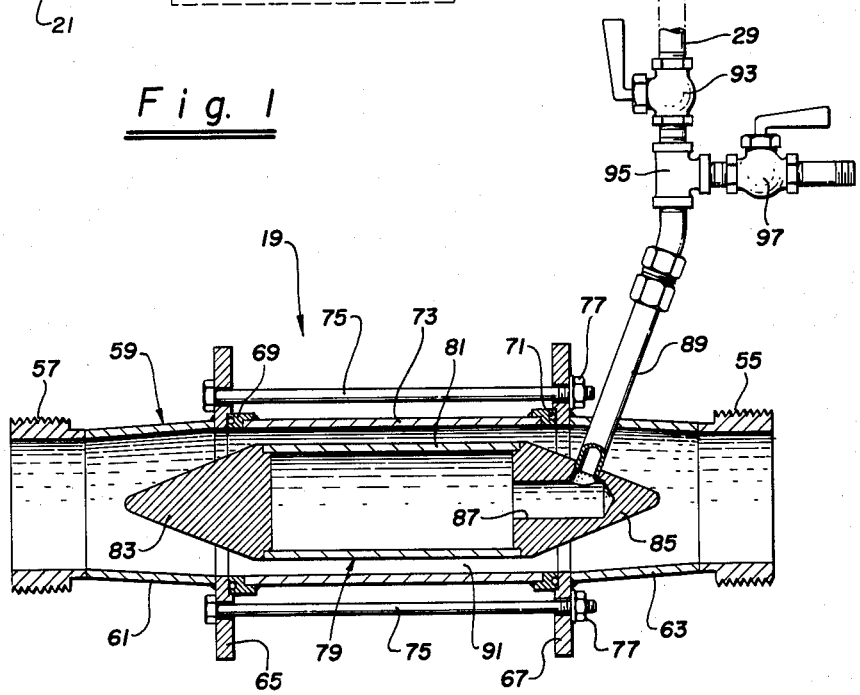
FIGURE 2 is one embodiment of a carbonator to be employed in a system of this invention.

Referring to FIGURE 2, the carbonator 19 is shown in more detail. The carbonator includes an input coupling 55 and an output coupling 57 at opposite ends of an outer housing 59. Thus, referring to FIGURE 1, the coupling 55 is connected to the line 15 while the coupling 57 is connected to the line 31.

The housing 59 may itself, comprise a pair of conically shaped units 61 and 63 secured to brackets 65 and 67 respectively. On the faces of the brackets 65 and 67 opposite the sections 61 and 63 there may be located O-ring type gaskets 69 and 71 and a cylindrical tube 73 retained between the gaskets 69 and 71 by means of bolts and nuts 75 and 77 respectively. Thus, the housing 59 is a complete water-tight unit.

Within the housing 59 and located in registry with the cylindrical tube 73 there is located an inner housing 79. The inner housing 79 includes a cylindrical tube 81 preferably of stainless steel. The tube 81 is porous or sintered and is of approximately five microns porosity. At each end of the tube 81 are secured solid conical plugs 83 and 85. One of the conical plugs 85, for instance, includes a central opening 87 in communication with a rigid line or tube 89.

The tube 89 is secured to the plug 85 and passed through the conical section 63 to the exterior of the outer housing 59. The tubing 89 may be secured to the conical section 63 by means of welding or the like. Thus, a portion of the tube 89 and the entire inner housing 79 are held in position within the outer housing 59.

The size relationship of the inner housing 79 with respect to the tube 73 is such that the annular area 91 about the housing 79 is smaller than the cross section area of the inlet and outlet couplings 55 and 57 thereby presenting a constricted passage within the outer housing 59. Thus, liquid passes about the inner housing 79 at a high velocity.

The source of carbon dioxide is connected to the carbonator 19 by means of the tubing 89 through the line 29 and the normally open valve 93. The line 29 also includes a T connection 95 which is connected to a normally closed valve 97.

In operation of the carbonator then, the carbon dioxide is passed through the line 29, valve 93, and tubing 89 to the opening 87 in the interior of the inner housing 79. At the same time water is passed through the coupling 55 about the inner housing 79 and out of the coupling 57. Since the tube 81 of the inner housing 79 is porous or sintered, gas may pass through the wall thereof into the stream of water passing about the housing. Such passage of water may be facilitated either by placing the carbon dioxide under pressure or by merely using the venturi action of high velocity water about the inner housing. Preferably, however, the gas is emitted into the water by use of both the high pressure of the carbon dioxide and by the venturi action of the carbonator itself.

Since commercial supplies of carbon dioxide normally have a certain amount of carbon therein it is apparent that upon continued use of the carbonator 19, the pores in the cylinder 81 will eventually become clogged. For this reason the valves 93 and 97 are provided in order to backwash the carbonator. In the backwash operation the valve 93 is closed and the valve 97 is opened to the atmosphere or to a suitable container. Pressure may be applied on the outside of the inner housing 79 either by closing the valve 17 (FIGURE 1) and utilizing pressure within the cooling tank 33 or by closing the line 31 (FIGURE 1) and applying water to the carbonator 19 through the line 15. In either case there will be a reverse flow through the inner housing 79 and the carbon in the pores of the cylinder 81 will be removed and vented through the valve 97.

Figure 3:
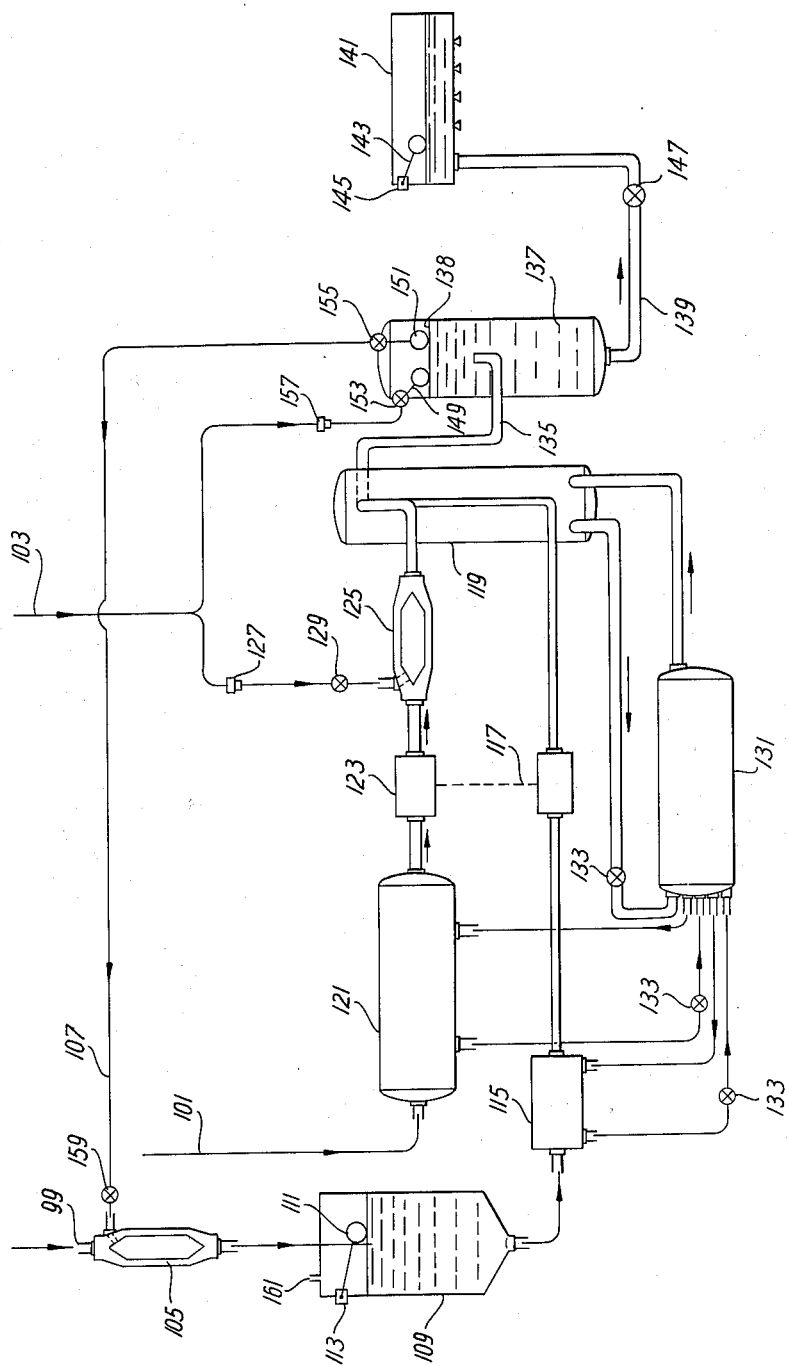
FIGURE 3 is a schematic diagram of a system in accordance with another embodiment of this invention.

Referring to FIGURE 3, another embodiment of the invention is shown. Here again, there are three sources of material to be used: syrup, water, and carbon dioxide. The syrup is applied through the line 99, the water through the line 101 and the carbon dioxide through the line 103.

The syrup is passed through a carbonator 105 of the type shown in FIGURE 2. Small amounts of carbon dioxide are applied through the line 107 from a source which will be explained hereinafter. Thus, the syrup is slightly carbonated and then passed to a syrup supply tank 109. The level of syrup in the tank 109 is maintained by a float 111 connected to a switch designated at 113. The switch 113 serves to control pumps which supply syrup through the line 99. From the supply tank 109 syrup is fed to a cooler 115 and passed by means of a pump 117 to a second stage cooler and mixing tank 119.

Water from the line 101 is passed through a cooling tank 121 and, by means of a pump 123, through a carbonator 125 to the same cooling and mixing tank 119. The carbonator 125 is also of the type shown in FIGURE 2. Carbon dioxide is applied to the carbonator 125 from the line 103, the solenoid operated valve 127 and the volume regulating valve 129.

Cooling is accomplished in the coolers 115 and 121 and in the tank 119 by means of circulating brine, propylene glycol or other coolants. The coolant is refrigerated in a brine tank 131 by means of conventional refrigeration equipment. The coolant, however, is maintained at a temperature of about 32° to 33° whereby freezing of the products in the various coolers and tanks 115, 121 and 119 is avoided. The amount of brine necessary for the cooling may be regulated by means of temperature control valves 133 which may be operated by means of thermal couplers in either the brine lines themselves or in contact with the carbonated product. From the mixing and cooling tank 119 the product is passed through the line 135 to a stabilizing and deaerating tank 137.

It is noted that the product is admitted into the stabilizing tank below the level 138 of the finished product within the tank and further that the product is forced into the stabilizing tank 137 in an upward direction. Thus, in the stabilizing tank further deaeration is accomplished and the stable finished product settles to the bottom where it is drawn off through the line 139 to a filler head 141. The filler head 141 includes a closed vessel for containing a predetermined quantity of liquid therein, and for dispensing the same through nozzles 142 provided at the lower side of the vessel. The level of the finished product in the filler head 141 is sensed by means of a float 143 and a switch 145. The switch 145 serves, when the level in the filler head 141 reaches a predetermined high limit, to turn off the pumps 117 and 123 and to close the valve 147 in the line 139. Moreover, the switch 145 serves to close the solenoid valve 127 in the carbon dioxide line.

Referring again to the stabilizing tank, it is noted that there are two floats 149 and 151 included therein. Each of these floats serves to operate its respective valve 153 and 155. The valve 153 is connected to the carbon dioxide line 103 through a pressure regulator 157. The pressure regulator 157 is adjusted to a pressure slightly higher than the pressure which is normally within the stabilizing tank itself. Thus, when the valve 153 is open carbon dioxide is passed into the head space of the stabilizing tank 137. The valve 155 serves as a bleed-off valve and, when open by means of the float 151, serves to admit carbon dioxide into the line 107 through the check valve 159 to the carbonator 105.

In the operation of the system as shown in FIGURE 3, cooling brine is circulated through the coolers 115 and 121 and mixing and cooling tank 119. Syrup is applied through the carbonator 105 along with the very small amount of carbon dioxide from the head of the stabilizing tank 137.

This small amount of carbon dioxide in the syrup serves to drive off excess air in the syrup which is passed to the atmosphere through a vent 161 in the syrup supply tank 109.

From the syrup tanks, the syrup is passed through the cooler 115 which lowers the temperature of the syrup to approximately 40° F. The amount of syrup passed to the mixing and cooling tank 119 is regulated by means of the pump 117 which acts in cooperation with the pump 123 to provide a predetermined proportion of water and syrup. Water passed through the line 101 may be previously deaerated by conventional equipment such as a vacuum deaerator. The water is cooled in the cooler 121 also to about 40° F. The pump 123, as previously mentioned, acts in cooperation with the pump 117 to provide a predetermined portion of water and passes the water to the carbonator 125.

Carbon dioxide is also applied to the carbonator 125 and the adjustable regulator 129 serves to regulate the amount of carbon dioxide passing through the carbonator. Thus, for high carbonation the regulator 129 may be adjusted to a high value while for less carbonation, the regulator 129 would be adjusted to a lower value. Due to the action of the carbonator 125, the water from the pump 123 is easily carbonated at low pressures in the order of 30 to 35 pounds regardless of the degree of carbonation determined by the regulator 129. With water at the temperature of 40° F. and a pressure of about thirty pounds per square inch, the carbonation value of about 4.3 volumes of carbon dioxide to one volume of water is permissible. This volume is well in excess of any amount of carbonation desired in usual soft drinks or beverages.

Moreover, the water is even further cooled in the process of carbonation since carbon dioxide is applied in a liquid state. As the carbon dioxide is passed into the water it expands to a gaseous state thereby providing a cooling effect to the water. As the carbonated water and the syrup are passed to the mixing and cooling tank 119, they are still further cooled such that a stabilizing effect takes place. With this reduction of temperature, the carbonated liquid is susceptible to even more carbon dioxide and is thus reluctant to pass off that carbon dioxide which is already absorbed.

Pressure of carbon dioxide passed into the tank 137 is regulated by means of the pressure regulator 157. This regulator is adjusted to a value only slightly higher than that pressure at which it is desired to operate in the tank 137 and the filler head 141. Incoming carbon dioxide through the regulator 157 forces the level 138 downward until the valve 153 is again closed. In addition, since the liquid from the line 135 passing into the tank 137 causes a turbulence at the top of the tank, air and carbon dioxide is emitted to some extent. Thus, the pressure in the head of the tank is increased whereby the level 138 is lowered.

The pressure in the tank 137 and thus in the filler head 141 is maintained by means of the floats 149 and 151 and their respective valves 153 and 155. When the level 138 in the tank rises (due to a decrease in head pressure) above a predetermined point, the valve 153 is opened by means of the float 149 and carbon dioxide from the line 103 is passed into the head space of the tank 137. On the other hand, when the level 138 goes below (due to an increase in head pressure) a predetermined point the valve 155 is opened by means of the float 151.

With the valve 155 open, carbon dioxide and any traces of air or other impurities, are bled off through the line 107 to the carbonator 105. Thus, it is seen that the level 138 in the stabilizing tank 137 pulsates up and down causing alternate operation of the valves 153 and 155. The pressure in the filler head 141 serves as a back pressure in a stabilizing tank 137. Consequently, the higher the pressure adjustment of the regulator 157 over the operating pressure of the filler head 141, the faster the pulsations of the valve 153 and 155 and the greater the supply of gas applied to the carbonator 105.

Since the bulk of the gas in the head of the stabilizing tank 137 is carbon dioxide including only traces of air, the carbon dioxide passed into the syrup at the carbonator 105 serves to deaerate the syrup when it reaches a supply tank 109. This deaeration of the syrup serves to provide a more stable end product.

By way of example, it may be assumed that the filler head 141 is operated at 25 pounds pressure and that it is required to carbonate the beverage to the degree of three and one-half volumes of carbon dioxide to one volume of water in syrup. If the product temperature is 34° F., it would only require eighteen pounds of pressure for absolute saturation of carbon dioxide to the degree desired. Thus, the carbonation pressure is considered eighteen pounds. The product is subjected to twenty-five pounds pressure in the stabilizing tank 19 and in the filler head 141. This twenty-five pounds pressure will be maintained by the pressure regulator 157 which will be set slightly higher than twenty-five pounds, for instance at thirty pounds of pressure. Thus, even the low pressure of twenty-five pounds per square inch in the filler head 141 will serve to prevent the escape of carbon dioxide from the beverage. Moreover, since the carbonation pressure is only eighteen pounds per square inch even traces of impurities such as sulphur dioxide or air will not cause foaming at the filler head.

In addition, any impurities which are collected in the beverage through the source of carbon dioxide will escape into the head of the stabilizing tank 137 and be passed through the carbonator 105. From thence they escape from the syrup supply tank 109 into the atmosphere through the vent 161. Thus, foaming due even to impurities in the carbon dioxide supply is eliminated.

Figure 4:
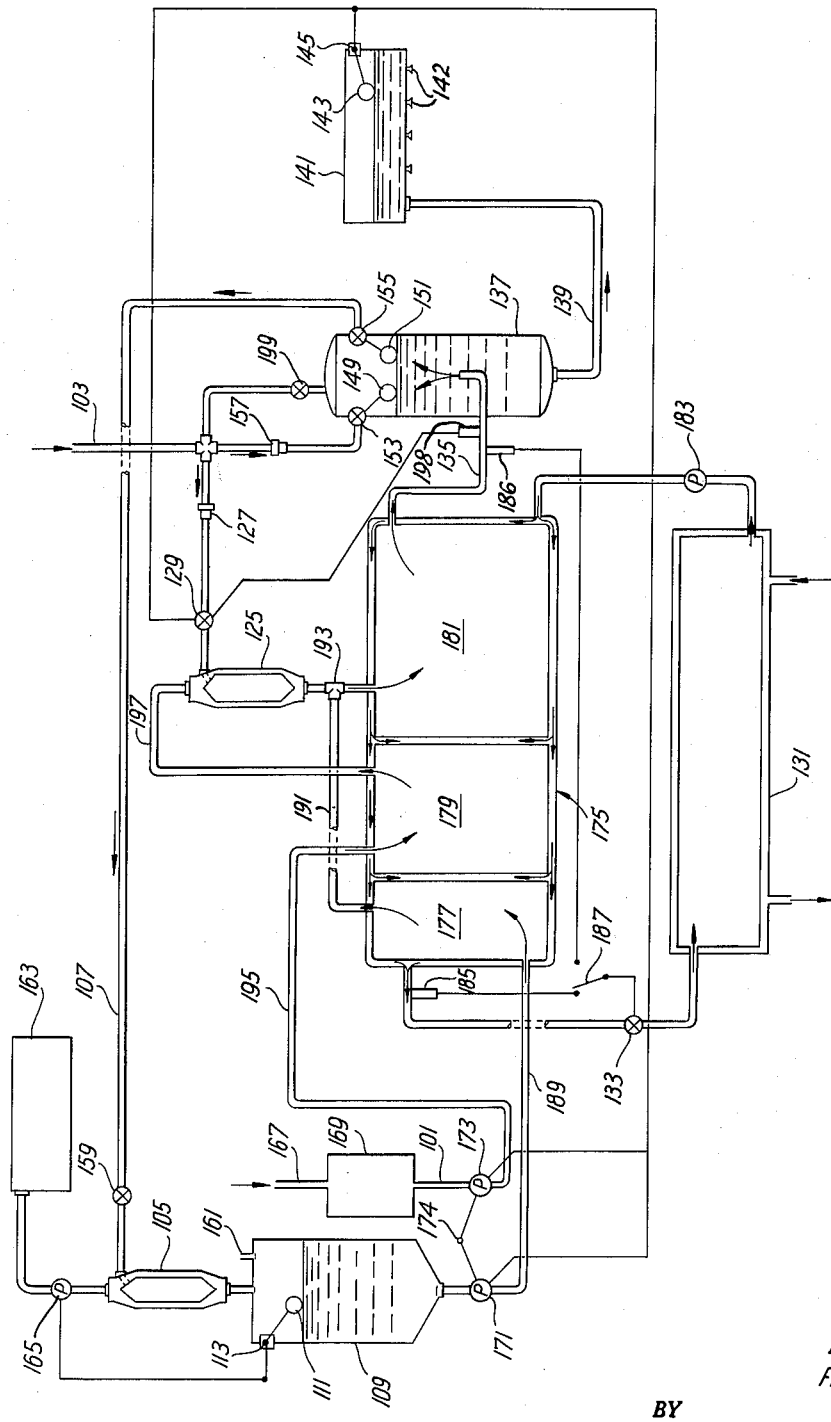
FIGURE 4 is a diagram of a system in accordance with still another embodiment of this invention.

Referring to FIGURE 4 still another embodiment of the invention is shown. It is noted in FIGURE 4 that many of the elements are similar to those in FIGURE 3 and consequently, have like reference numerals.

A syrup storage tank 163 is connected to the carbonator 105 through a pump 165. The pump 165 is activated by the switch 113 which in turn is operated by the float 111 in the syrup supply tank 109. Thus, when the level in the tank 109 reaches a predetermined load level the switch 113 closes thereby applying power to the pump 165.

Water from any desired source is passed through the line 167 through a water deaerator 169, such as of the vacuum deaerating type, to the line 101. Syrup from the supply tank 109 and water from the line 101 are passed from the pumps 171 and 173 respectively. The pumps 171 and 173 take the place of the pumps 117 and 123 of FIGURE 3 but are placed in the line prior to the cooling stages. Thus, in the embodiment shown in FIGURE 4, the pumps 171 and 173 serve to positively force the water and syrup through the entire system to the stabilizing tank 137. A ratio determining synchrometer, or the like, 174 serves to regulate the proportion of syrup and water by adjusting the delivery volume of the pumps 171 and 173.

The cooling device shown in FIGURE 4 includes a single cooling tank 175 which may include three sections 177, 179 and 181 each of which may include a plurality of hollow cooling plates through which is passed a coolant from the tank 131. The coolant is passed from the tank 131 by means of a pump 183 first to the section 181 and then through the sections 179 and 177 back through a regulating valve 133 to the tank 131. The coolant is maintained in the tank 131 at approximately 30° to 33° F. and since it is passed first to the section 181, the heat transfer in this section is greatest. As the temperature of the coolant increases due to the heat transfer throughout the tank 175, it is employed to cool water in the section 179 and syrup in the section 177.

The degree of cooling may be regulated by means of a thermocouple 185 connected in the coolant line itself and coupled to the pump 133 through the switch 187. Alternatively, a thermocouple 186 may be included in the product output line 135.

Syrup from the pump 171 is passed to the cooling section 177 through the line 189 from thence through the line 191 to a mixing valve 193. Water is passed from the pump 173 through the line 195 to the cooling section 179 and from thence through a pipe 197 and the carbonator 125 to the same mixing valve 193. The mixture of syrup and water from the mixing valve 193 is passed into the final cooling section 181 and from thence to the outlet line 135 to the stabilizing tank 137.

In the tank 175 the syrup is cooled in the section 177 to a temperature of about 50° to 60° F., while the water in the section 179 may be cooled to 45° to 50° F. The complete mixture in the section 181 is cooled to 32° to 35° F., thus, it is seen that a single pass of a coolant in the tank 131 serves to provide two stage cooling, one stage of cooling for the syrup and the water individually being prior to carbonation in the carbonator 125 and a second stage of cooling of the mixed product in the section 181 being subsequent to carbonation.

Operation of the floats 149 and 151 and the valves 153 and 155 is similar to that as described in FIGURE 3. In addition, however, there is included a manual valve 199 connected between the head of the tank and the carbon dioxide line 103 which may be used to bypass the pressure regulator 157 and the valve 153.

The switch 145 operated by the float 143 and the filler head 141 serves, when the head 141 reaches a predetermined high limit, to turn off the pumps 171 and 173 and to close the solenoid operated valve 129 in the carbon dioxide line. Thus, it is apparent that when the filler head 141 becomes loaded to a predetermined extent the entire system is stopped. Since the carbonation is accomplished within the carbonator 125 and further since the solenoid valve 129 is closed upon operation of the switch 145, it is apparent that stoppage in the line will not cause overcarbonation of the beverage. Other switches may be connected at other points in the complete system (such as at the bottle capper) similar to the switch 145 to stop operation of the pumps 171 and 173 and to close the valve 129, when a mechanical stoppage is experienced. An example of such a switch is shown in the output line 135, wherein the switch assembly 198 detects a flow stoppage in the line and serves to close the valve 129.

Thus, it is seen that a fluid carbonation system and apparatus is provided, wherein it is possible to employ low pressures upon the liquid to be carbonated at all stages of the system. Moreover, it is seen that with the system and apparatus described, the tendency of the liquid to foam, even when the carbon dioxide includes some impurities, is greatly reduced. In addition, it is seen that the carbonation may be accomplished with relatively high speed, whereby canning and bottling equipment may be run at the full operating speed without the requirement of additional or oversize carbonating equipment. Even with this high speed operation it is further noted that with a system as defined, the stoppage of the line due to mechanical failure or overfilling of the filler heads will not cause overcarbonation of the product.

Moreover, since liquid carbon dioxide may be employed, it is unnecessary with the system as defined to use heating coils in the carbon dioxide storage tanks. Also, since the temperature of the coolant employed is merely at or above the freezing temperature of water, it is apparent that icing of the cooling coils is prevented whereby the temperature throughout the product as well as the Brix throughout the product, is uniform.

I claim:

1. A system for carbonating liquid comprising a cooling tank, a source of liquid to be carbonated, a line connected between said cooling tank and said source of liquid whereby the liquid may be passed to the tank, a source of carbon dioxide, carbonating means connected to said source of carbon dioxide and disposed in said line for applying carbon dioxide to the liquid to be carbonated before its entry to the cooling tank, a stabilizing tank, in communication with said cooling tank, means for urging the liquid to be carbonated through said carbonator and said cooling tank into said stabilizing tank, said stabilizing tank including first and second float operated valve means, the first float valve means being operable to open when the liquid level in the tank is above a first predetermined limit, the second float valve means being operable to open when the liquid level in the tank is below a second predetermined limit, said first float valve being connected to a source of carbon dioxide under pressure, whereby when the liquid level in the stabilizing tank rises above the first predetermined limit, carbon dioxide is applied to increase the pressure in the tank and lower the liquid level, the second float valve means surves to bleed off excess carbon dioxide in said tank when the liquid level drops below said second predetermined limit, a filler head including a closed vessel for retaining a predetermined level of liquid therein and for dispensing the same, means including third valve means connecting said filler head with said stabilizing tank so that the pressure in said filler head is regulated by the first and second valve means in said stabilizing tank, means in said filler head for detecting the liquid level therein, and means operable in response to said last named means for closing said third valve when the liquid level in the filler head rises above a predetermined limit.

2. A system as defined in claim 1 together with a source of syrup, means for connecting said source of syrup to said cooling tank, and means for applying the output of said second float valve means to the syrup prior to its passage to the cooling tank whereby the syrup is deaerated.

3. A system as defined in claim 1 wherein said carbonating means is of the venturi type comprising an outer housing, an inner housing supported within said outer housing, said inner housing comprising a tube of stainless steel having approximately 5 microns porosity, a pair of conical plugs mounted at each end of the cylindrical tube to seal the same and to provide a smooth contour for fluid flow therearound, conduit means communicating with the interior of said inner housing to deliver carbon dioxide thereto, the size relationship of the inner housing with respect to the outer housing is such that the annular area for fluid flow thereabout is smaller than the cross-section area of the line connecting the first and second cooling means so that the fluid flowing through the carbonating means passes therethrough at a high velocity.

4. A system for the manufacture of carbonated soft drinks comprising a source of syrup, a syrup storage tank, vent means in said storage tank for the release of gas therein, a first carbonator connected between said source of syrup and said syrup supply tank, a source of water, first and second cooling means, means for pumping syrup from said supply tank and water from said source through said first and second cooling means respectively, a mixing valve, a second carbonator connected between the output of said second cooling means and said mixing valve, the output of said first cooling means also being connected to said mixing valve, third cooling means connected to the output of said mixing valve, a stabilizing tank having its input connected to the output of said third cooling means, whereby the mixed and cooled water and syrup is passed thereto, said stabilizing tank having its input intermediate the top and bottom thereof whereby a turbulent zone is provided above the input thereof and a settled zone is provided below the input thereof, a source of carbon dioxide, first and second float valve means provided in said stabilizing tank, said first valve means serving to place said source of carbon dioxide in communication with said stabilizing tank when the liquid level in said tank rises above a first predetermined point, said second valve means serving to place said first carbonator in communication with said stabilizing tank when the liquid level therein drops below a second predetermined point, a filler head including a closed vessel for retaining a predetermined level of liquid therein and for dispensing the same, and means placing said filler head in communication with the settled zone of said stabilizing tank, valve means connected between said source of carbon dioxide and said second carbonator, means in said filler head for detecting the liquid level therein and for closing said last named valve means and stopping the means for pumping syrup and water when the liquid level in the filler head rises above a predetermined limit.

5. In a system for preparing carbonated beverages the combination comprising a source of water to be carbonated, first cooling means connected to said source for pre-cooling the water to a temperature in the range from about 40–50° F., second cooling means for additional cooling of the water to a temperature below 35° F., a line connecting said first and second cooling means whereby the pre-cooled water may be passed to the second cooling means, carbonating means in said line, and a source of carbon dioxide connected to said carbonating means for applying the carbon dioxide to the pre-cooled water at the temperature established by the first cooling means before its entry to the second cooling means.

6. A system as defined in claim 5 wherein said carbon dioxide is in a liquid state as applied to the carbonating means.

7. A system as defined in claim 5 together with a source of syrup and means for connecting said source of syrup to the second cooling means whereby the second cooling means also serves as mixing means and means for synchronizing said flow of syrup with the flow of liquid to be carbonated.

References Cited by the Examiner

UNITED STATES PATENTS

| 1,611,321 | 12/1926 | Schmidt |
| 1,902,887 | 3/1933 | Oppenheim _____ 261—99 |
| 2,201,430 | 5/1940 | Deibel. |
| 2,435,774 | 2/1948 | Di Pietro _____ 99—275 X |
| 2,575,267 | 11/1951 | Gottlieb _____ 261—19 |
| 2,657,628 | 11/1953 | Von Stoesen _____ 99—275 |
| 2,699,718 | 1/1955 | Wright _____ 99—275 |
| 2,707,911 | 5/1955 | Charpiat _____ 99—275 |
| 2,778,618 | 1/1957 | Bill _____ 261—19 |
| 2,870,016 | 1/1959 | Day et al. _____ 99—275 X |

FOREIGN PATENTS

| 694,918 | 7/1953 | Great Britain. |
| 739,665 | 10/1943 | Germany. |

WALTER A. SCHEEL, *Primary Examiner.*

GEORGE A. NINAS, Jr., ROBERT E. PULFREY,
*Examiners.*

G. P. CHANDLER, S. P. FISHER, *Assistant Examiners.*